US008599848B2

(12) United States Patent
Janneteau et al.

(10) Patent No.: US 8,599,848 B2
(45) Date of Patent: Dec. 3, 2013

(54) COMMUNICATION OVER SELECTED PART OF A NETWORK

(75) Inventors: Christophe Janneteau, Gif-sur-Yvette (FR); Hong-Yon Lach, Gif-sur-Yvette (FR)

(73) Assignee: Motorola Mobility LLC, Libertyville, IL (US)

( * ) Notice: Subject to any disclaimer, the term of this patent is extended or adjusted under 35 U.S.C. 154(b) by 2272 days.

(21) Appl. No.: 10/497,118

(22) PCT Filed: Dec. 18, 2002

(86) PCT No.: PCT/EP02/14445
§ 371 (c)(1),
(2), (4) Date: May 27, 2004

(87) PCT Pub. No.: WO03/056778
PCT Pub. Date: Jul. 10, 2003

(65) Prior Publication Data
US 2004/0264461 A1 Dec. 30, 2004

(30) Foreign Application Priority Data
Dec. 28, 2001 (EP) .................................. 01403390

(51) Int. Cl.
*H04L 12/28* (2006.01)
*H04L 12/56* (2011.01)
(52) U.S. Cl.
USPC ......................................... 370/390; 370/401

(58) Field of Classification Search
USPC .......................................................... 370/390
See application file for complete search history.

(56) References Cited

U.S. PATENT DOCUMENTS 5,862,345 A * 1/1999 Okanoue et al. ............... 709/238
5,930,259 A * 7/1999 Katsube et al. ................ 370/409
(Continued)

FOREIGN PATENT DOCUMENTS

JP 10-247917 A 9/1998
JP 11-046192 A 2/1999
(Continued)

OTHER PUBLICATIONS

Japanese Patent Office; Patent Application No. 2003-557168; Notice of Reason for Rejection (English Translation); Nov. 2, 2007; 2 pages.

*Primary Examiner* — Chirag Shah
*Assistant Examiner* — Suk Jin Kang

(57) ABSTRACT

A method for communicating regional broadcast datagrams over a network in which the regional broadcast datagrams are routed using destination identifications wherein a sender terminal sends regional broadcast datagrams to a sub-network grouping server that selects a plurality of sub-network servers according to criteria defined by the sender terminal and chosen as a function of information derived from the sender terminal without the individual destination identifications of the destination terminals being specified by the sender terminal, and wherein the sub-network grouping server provides regional broadcast datagrams to the selected sub-network servers, which subsequently provide the regional broadcast datagrams to a plurality of destination terminals.

19 Claims, 2 Drawing Sheets

(56) References Cited

U.S. PATENT DOCUMENTS

| | | |
|---|---|---|
| 6,011,782 A | 1/2000 | DeSimone et al. |
| 6,181,697 B1 * | 1/2001 | Nurenberg et al. ............ 370/390 |
| 6,633,765 B1 * | 10/2003 | Maggenti ...................... 455/503 |
| 6,873,627 B1 * | 3/2005 | Miller et al. .................. 370/466 |
| 7,016,353 B2 * | 3/2006 | Proctor et al. ................. 370/392 |
| 7,031,326 B1 * | 4/2006 | Shur et al. ..................... 370/401 |
| 2001/0009017 A1 | 7/2001 | Biliris et al. |
| 2002/0007414 A1 * | 1/2002 | Inoue et al. ................... 709/230 |
| 2002/0150094 A1 * | 10/2002 | Cheng et al. ................. 370/389 |
| 2003/0087629 A1 * | 5/2003 | Juitt et al. ..................... 455/411 |

FOREIGN PATENT DOCUMENTS

| | | |
|---|---|---|
| JP | 2002285361 A | 10/2001 |
| RU | 2118051 C1 | 8/1998 |
| WO | 0119029 A1 | 3/2001 |
| WO | WO 01 19029 A | 3/2001 |
| WO | 0161960 A2 | 8/2001 |
| WO | 0163877 A1 | 8/2001 |

* cited by examiner

COMMUNICATION OVER SELECTED PART OF A NETWORK

CROSS-REFERENCE TO RELATED APPLICATIONS

The present application claims benefits under Title 35, United States Code, Sections 119 and 365 of copending European Application No. 01403390.6 filed on 28 Dec. 2001 and copending International Application No. PCT/EP02/14445 filed on 18 Dec. 2002.

FIELD OF THE INVENTION

This invention relates to communication between terminals in a plurality of sub-networks of a network, in which the datagrams are routed using destination identifications contained in the datagrams and particularly, but not exclusively, where the terminals are addressed by Internet protocol ('IP'). The invention is applicable where the sub-networks are differentiated geographically, and is described with reference to such a differentiation, but embodiments of the invention are also applicable where the sub-networks are differentiated according to other criteria.

BACKGROUND OF THE INVENTION

Various methods exist for selective communication between a terminal and a plurality of other terminals in a network, in which the terminals are addressed by Internet protocol, including broadcasting and multicasting.

The most common type of IP communication is a unicast communication, that is to say, in which the communication is established between nodes whose individual addresses are identified in the datagrams transmitted. If a server is to send the same datagrams to more than one address, it must repeat the datagrams with each individual address. The unicast method of transmission is accordingly ill suited to mass distribution of messages or other communications to many destinations and is inapplicable if the IP address of the intended recipients is unknown to the sender.

To meet the requirement for transmitting Internet communications to many destinations, whose address may be unknown to the sender, a modified Internet protocol is available for multicast services. IP multicasting is the transmission of an IP datagram to a "host group", a host or a set of hosts identified by a single IP destination address. A multicast datagram is delivered to all member terminals of its destination host group with the same "best-efforts" reliability as regular unicast IP datagrams, i.e., the datagram is not guaranteed to arrive intact at all members of the destination group or in the same order relative to other datagrams. The membership of a host group is dynamic; that is, hosts may join and leave groups at any time. An IP module may only receive datagrams if it has previously sent a request to join the group, specifying the group multicast address.

There is no restriction on the location or number of members in a host group. An incoming datagram destined to one of those groups is processed exactly the same way as datagrams destined to one of the host's individual addresses. Incoming datagrams destined to groups to which the host does not belong are identified by the group address and discarded without generating any error report or log entry.

Multicasting does not contain any mechanism for selection of the destination terminals by any criteria other than the addresses of the nodes that have registered membership of the host group and, in particular, does not offer the possibility of location-specific communication, that is to say, communication to nodes (terminals) having unspecified addresses within a chosen geographical area.

Patent specification WO 01/01718 "Location management for cellular systems" describes a method for determining a mobile station location based on information sent by the mobile terminal to the Regional Network Controllers ('RNCs'). However, it does not disclose any method of communicating datagrams with numerous terminals selected according to chosen criteria, such as their geographical position.

Digital broadcasting, and in particular digital television, is another service enabling the transmission of programmes or other communications to many destinations over cable connections or satellite or terrestrial wireless electromagnetic transmissions. Broadcasting differs from IP transmission in that the communication is essentially unidirectional; if interaction is desired with the destination, the response of the destination must be through a different link, such as the Internet or telephony communications. Each transmission on a given channel reaches all receivers connected to that channel. While the coverage of broadcasting is inherently somewhat limited geographically, this does not enable selection of the destination terminals by chosen criteria and, in particular, does not offer the possibility of location-specific communication, that is to say, choosing the geographical area for the communication.

Data streams additional to the broadcast services may be transmitted over the same broadcast channels ('encapsulated'). Patent specification WO 01/10081 describes a broadcast network for transmitting broadcast information and an event manager to add event information to the broadcast information. The event information either comprises information defining/identifying the specific end user device to which the event message is to be directed or does not contain any such information and is transmitted to all end user devices, without selection. In both cases, there is no selection of the end user devices by any criteria other than their addresses and, in particular, does not offer the possibility of location-specific communication, that is to say, communication to nodes (terminals) within a chosen geographical area.

International Patent Application WO 01/19029 describes a packet-switched network in which a routing means receives data packets from a sender and buffers data packets whose destination address is a multicast address of a multicast group. A control means designates filters for each receiver and/or for receiver-specific addresses determined by the control means, and supplies the determined addresses and designated filters to the routing means, which filters the multicast data packets and/of the determined addresses with the designated filters for each receiver of the multicast group and supplies the filtered multicast data packets to the filtered receiver addresses.

A need exists for a method enabling communication of datagrams over a communication network from one terminal to numerous other terminals selected according to criteria chosen as a function of information derived from the transmitting terminal.

SUMMARY OF THE INVENTION

The present invention provides a method of and apparatus for communication of datagrams over a network as described in the accompanying claims.

DETAILED DESCRIPTION OF THE PREFERRED EMBODIMENTS

Figure 1:
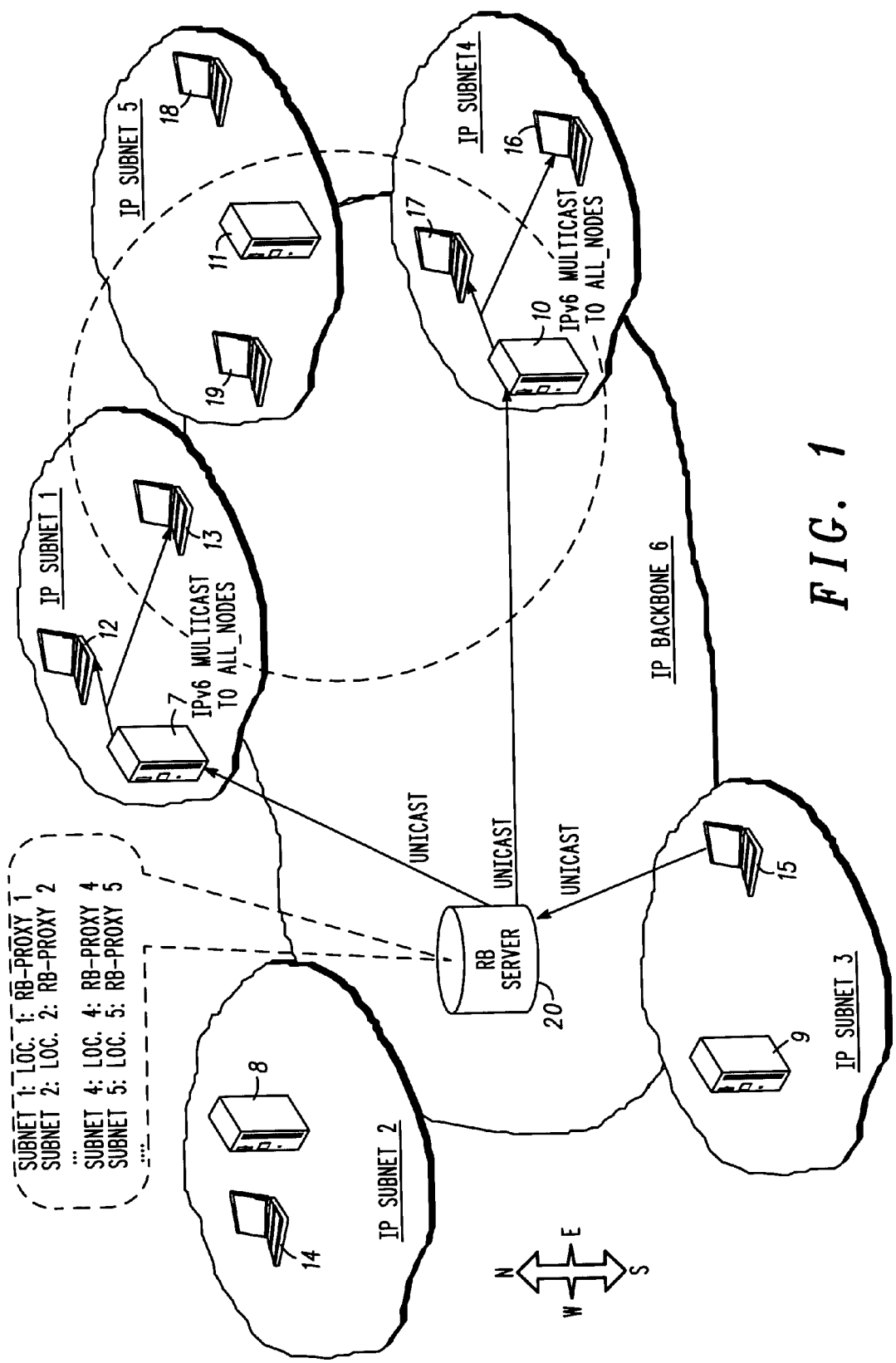
FIG. 1 is a schematic diagram of a regional broadcast system in accordance with one embodiment of the invention.

In the preferred embodiment of the invention shown in FIG. 1, the communication system utilises the Internet backbone but the invention is also applicable to other embodiments in which the datagrams are sent over other networks. The network communication system shown in FIG. 1 of the drawings comprises IP sub-networks 1 to 5, defined by common elements (bits in the case of IPv4 or prefixes in the case of IPv6) of the Internet addresses allocated to them, The sub-networks 1 to 5 are separated from the Internet backbone by simple routers or by gateways. In accordance with this embodiment of the present invention, respective sub-network proxy servers 7 to 11 are associated with the sub-networks 1 to 5. The proxy servers 7 to 11 are preferably directly connected in the sub-network, without interposition of a router; this enables the "All_Nodes" address of the IPv6 protocol to be used to contact all nodes in that sub-network, for example. User terminals such as 12 to 19 communicate with the IP sub-networks 1 to 5.

In the preferred embodiment of the present invention, the user terminals are mobile and communicate with the IP sub-networks 1 to 5 over wireless connections. In this case, it is frequent for the user terminals 12 to 19 to move from one of the IP sub-networks to another. However, the present invention is also applicable to normally immobile terminals, whether or not they change sub-networks, as portable computers especially may do, for example.

The mobile user terminals may take the form of so-called $3^{rd}$ generation cellular telephone terminals, which enable the transmission of data as well as voice or other sound by packet-switched routing. Among 3rd generation cellular standards are the UMTS 3GPP ($3^{rd}$ generation Partnership Project) and 3GPP2 standards, of the European Telecommunications Institute ('ETSI') and the International Mobile Telecommunications-2000 ('IMT-2000') standards. Other wireless communication standards that are applicable to user terminals in systems in accordance with the invention include the ETSI HiperLAN and IEEE 802.11b local area network standards, for example.

The nodes in the sub-networks 1 to 5 communicate with the Internet backbone and hence with other sub-networks and terminals according to the Internet protocol standards and the present invention is particularly applicable to systems using the IPv6 standards of the Internet Engineering Task Force ('IETF'). However, the invention is also applicable to other packet-switched protocols, such as the Internet IPv4 standard, and, indeed, to other network communication systems in which the datagrams are routed through the network using destination identifications, or addresses, contained in the datagrams.

As mentioned above, there is a need for a capability for terminals to be able to transmit a message to numerous other terminals but a difficulty arises in such systems in specifying the individual addresses of the destination terminals, which may be unknown to the sender. In the context of the present invention, such a message transmission (whether unidirectional or bi-directional, with responses from the destination terminals) where the sender does not identify the individual destination addresses will be referred to as a 'regional broadcast'.

In the embodiment of the present invention shown in FIG. 1, the communication system includes a regional broadcast server 20 that is in communication with the Internet backbone at a publicly known address. The regional broadcast server 20 constitutes a sub-network grouping server that enables a plurality of the sub-network proxy servers to be selected and datagrams to be communicated from the sender to the regional broadcast server 20 and from the regional broadcast server 20 to destination terminals within the corresponding selected sub-networks.

In operation, a user terminal such as 15 that is to transmit a regional broadcast message sends the datagram by unicast transmission to the regional broadcast server 20. The regional broadcast server 20 then selects a plurality of the sub-network proxy servers 7 to 11 and provides communication of datagrams between the sender terminal 15 and destination terminals within the corresponding selected sub-networks, in this example the sub-networks 1 and 4. The selection is made according to criteria chosen as a function of information derived from the sender terminal 15 without the individual destination identifications of the destination terminals being specified by the sender terminal 15. Accordingly, it is unnecessary for the sender terminal to transmit the individual addresses of numerous destination terminals, which would represent both a heavy memory load on the user terminal and a large overhead on the communication traffic. In addition, it becomes possible for the sender terminal to choose terminals as destination without knowing their identity, for example on the criterion that they are situated in a particular vicinity.

In this embodiment of the invention, the information derived from the sender terminal 15 for selection of the destination sub-network servers, in this case proxy servers, includes characteristics of the sub-networks related to the criteria and the sub-network grouping server stores correspondence data indicative of the correspondence between the characteristics of the sub-networks and the addresses of the sub-networks. The regional broadcast message may then be transmitted by the selected proxy servers to all nodes that they serve, as in the preferred embodiment of the invention, using the IPv6 "all-Nodes" multicast address, for example.

In a preferred embodiment of the present invention, the sub-networks 1 to 5 are geographically restricted and the criteria for selection include the geographical positioning of the sub-networks relative to respective geographical regions.

In one embodiment of the present invention, the information for selection of the sub-network proxy servers is contained in the datagrams sent by the sender terminal. In this case, the user terminal stores, or receives from the regional broadcast server 20, a list of geographical areas corresponding to those served by the respective proxy servers and the destination information that it sends to the regional broadcast server 20 includes the identification of the desired areas selected from this list. The regional broadcast server 20 utilises its internal database to select the sub-networks that correspond to the areas identified in this way.

Alternatively, or in addition, other criteria for selection may be made, for example, an encrypted transmission, such as a video transmission for example, may be sent with different encryption keys to different sub-network proxy servers, only the transmission with the key used by the user terminals in the corresponding sub-network being sent to that sub-network. The terminal sending the transmissions identifies the key used for each transmission and the regional broadcast server 20 selects the sub-networks utilising the corresponding key and sends the transmission to the selected sub-network proxy servers.

In another embodiment of the present invention, the regional broadcast server derives the information for selection of the sub-network servers from the position of the sender terminal 15. It is possible for the sender terminal to determine its position using a separate positioning system, such as the Global Positioning System ('GPS') and include the corresponding data in its datagram to the regional broadcast server 20. The regional broadcast server 20 stores the coordinates of the sub-network proxy server positions, maps the GPS position of the sender terminal 15 to the positions of the regional broadcast proxy servers 7 to 11 and selects those regional broadcast proxy servers whose position is within a specified distance. Alternatively, the regional broadcast server 20 may obtain the position of the sender terminal 15 from the identity of the proxy server 9 that serves the sub-network from which the sender terminal accesses the communication system.

The positions of the IP sub-networks are defined by their approximate centre in a simple embodiment of the invention. In this case, the criteria for selection include a radius around a central position, either specified by the sender terminal 15 or included in the selection parameters of the regional broadcast server 20. Alternatively, the regional broadcast server 20 may store geographical data defining in more detail the areas covered by the respective IP sub-network servers 7 to 11 and select those covering at least partially an area designated by the sender terminal 15, for example.

When used in Java-written applications, the regional broadcast Java Application Programme Interface ('API') may be implemented as a class RB that contains the two following methods:

---
Static void regional_broadcasting_send(network_position region_centre,
　　　double region_radius,
　　　byte[ ] broadcast_message)
Static byte[ ] regional_broadcasting_receive( )

---

The first method allows the broadcast of a message to a specific location area. It takes as inputs the message (table of bytes), the position of the center of the region as well as the radius of that region. The second method allows a terminal to receive messages that have been sent to a region this terminal is located in. The message is returned as a table of bytes.

The methods of the interfaces described above are client stubs that send requests to and receive replies from the regional broadcast server 20. FIG. 1 illustrates the sequence of messages generated in the network when the regional broadcast interface is called.

As shown in FIG. 1, the database in the regional broadcast server 20 includes, for each sub-network 1 to 5, its position Loc.1 to Loc.5 and the IP address of the corresponding regional broadcast proxy 7 to 11. The regional broadcast server 20 manages the database as a static database. The database can be filled-in manually by the network administrator at the time the service is started and updated as necessary. This architecture is scalable, easy to manage, easy to implement; it is capable, if desired, of working without any external positioning system such as GPS, whether real or emulated but is also capable of implementation in conjunction with such an external positioning system. In particular, the regional broadcast server and the regional broadcast proxy servers in each IP subnet are very simple servers that can be implemented with UDP sockets. Moreover there is no complex state machine in the servers, their behaviour is straightforward and the format of the database is very simple. The transmission of message to destination terminals identified by the regional proxy servers enhances the scalability of the system as there is no need to manage the position of all the nodes within the network.

An example format of the database may be (for IPv6):

| IP subnet prefix | GPS-like location coordinates | RB-proxy address |
| --- | --- | --- |
| <fec000000000398c> | {1.00.0:1.00.0:1.0:4.0:} | fec0::398c:2d0:59ff:fe05:c9ff |
| <fec000000000398c> | {1.00.0:1.00.0:1.0:4.0:} | fec0::3988:2d0:59ff:fe12:d67b |

The first field is a sub-network address, the second is the location of this sub-network, the third is the address of the associated regional broadcast proxy server.

Figure 2:
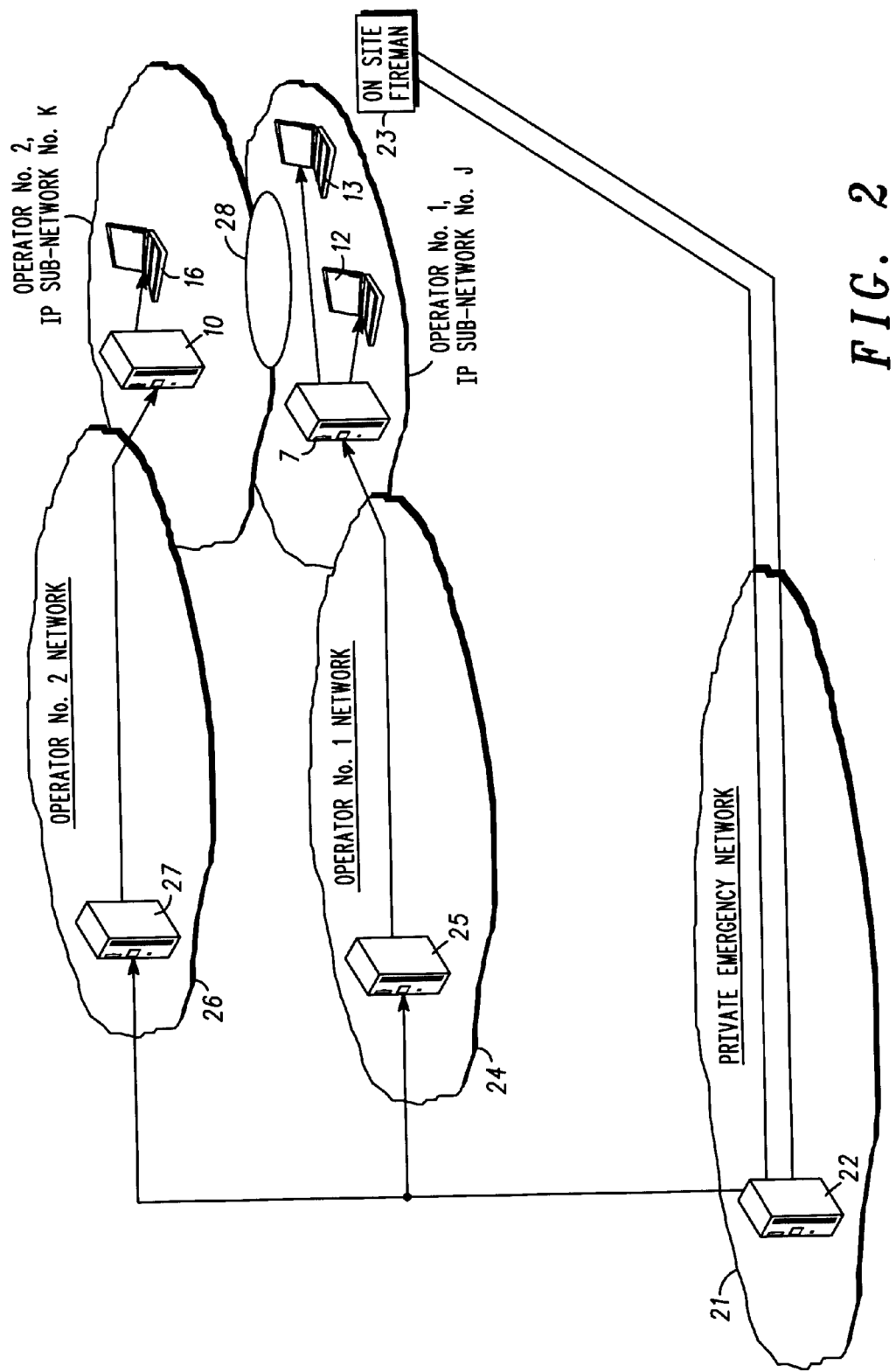
FIG. 2 is a schematic diagram of the application of the regional broadcast system of FIG. 1 to broadcasting warning messages to mobile terminals in the vicinity of an outbreak of fire.

FIG. 2 shows an example of the application of a system of the kind shown in FIG. 1 to a fire brigade broadcasting an alert concerning a fire to any user terminals in the vicinity of the fire.

Characterstics:
　Criteria of selection: location of IP sub-networks.
　No answer expected from receivers.
　Content: text/voice/video messages.
　Any access network types/multiples administrative domains.
　Fixed and mobile receivers.

The system shown in FIG. 2 comprises a private Intranet network 21 accessible by the fire brigade and police services for use in emergencies and which includes a regional broadcast server 22. The private network 21 is accessible for communication with mobile terminals such as 23 of firemen on site. The regional broadcast server 22 is linked for communication with a communication network 24 of a public operator #1, which includes a regional broadcast server 25 and a communication network 26 of a public operator #2, which includes a regional broadcast server 27.

As soon as a fire is detected in an area 28 (for example in a forest or other region where it is not easy to check on the presence of people in the vicinity), firemen may use the terminal 23 to trigger broadcasting of fire-alert messages in the vicinity of the area 28 so that any person located or crossing this zone and equipped with a user terminal such as 12 to 19 is immediately warned. As an emergency service, this alert message may be broadcasted via any public or private communication systems (e.g. public GSM/GPRS/UMTS/DAB-DVB operators, firemen/police dedicated security networks, etc. . . . ) covering this area.

In this example the firemen/police head-quarters hosts the primary "sub-network grouping server", the regional broadcast server 22, which will select the operator networks, such as 24 and 26 that are in coverage of the area on fire and transmit the message to the corresponding regional broadcast servers 25 and 27 in those operator networks. The regional broadcast servers 25 and 27 then select the sets of sub-networks the alert message must be broadcasted into and will send the message.

The original alert message may thus be generated by the firemen located at the site 28 of the fire and addressed to the head quarters that will broadcast it into the concerned geographical region via the network infrastructures covering the area of the fire. The message broadcast can provide real-time information on the local situation to anyone located in the region. The content of the message may be of any suitable type (text, voice, video . . . ), which can be adapted to the capabilities of the networks broadcasting the message.

Another example of usage of a system of the kind shown in FIG. 1 is its application to discovery of services within a geographic neighbourhood.

Characteristics:

Criteria of selection: location of IP sub-networks.

Answer(s) is/are expected from receivers

Content: structured message: —service description, info for response to the sender . . . etc Sender/Receivers are fixed or mobiles Architecture for location-aware services discovery In this case the regional broadcast server 20 is hosted by an operator wishing to offer location-aware service discovery facilities to its subscribers. An itinerant user looking for a service (for example a restaurant) within a specified distance (10 km for example) around its current location would then address its request to the operator. More specifically the user terminal such as 15 sends a message to the regional broadcast server 20 of the operator. The regional broadcast server 20 derives the set of sub-networks 1 and 4 this request should be broadcasted in, based on the area described in the request and identifies from the content of the message that it is addressed to restaurants. The sub-network proxy servers may select different multicast addresses corresponding to the nature of the requests so that, in this example, only restaurants having user terminals such as 12, 13 and 16 linked to the selected sub-networks 1 and 4 that have registered at a 'restaurant' multicast address receive the request. The content of the message broadcast includes information enabling responses, such as fax number or email address and may also include possible extra requirements specified by the user, for example a stipulation of a restaurant with a non-smoking area. The restaurants receiving the message may then respond to the request (for example send menu with prices) by contacting directly the potential client via the means he specified in his request. Of course several operators may co-operate in order to deploy such a service among all their networks so that the user benefits from a broader service community.

In order to support dynamic location-aware discovery of any type of services and mutual understanding between the client and the service provider, the preferred embodiment of the invention utilises a common language (syntax and semantics) to describe complex services. An existing standard (such as XML . . . ) is used in order to help in this definition. In addition to the service description, the service discovery request message itself is structured so that both the client and the service provider can understand it.

The following is an example of the structure of the service discovery request:

| Item | Content |
| --- | --- |
| Destination | Broadcast area(s) description (type, coordinates, etc . . .) e.g.: 10 km around my current location, in Paris, etc . . . |
| Request | Service(s) Description e.g.: a Pizzeria with a non smoking area, etc . . . |
| Desired response | Information expected in the answer (content, format, etc . . .) e.g.: map and guidance to the Pizzeria, menu, pictures, etc . . . |
| Identity/ies for response | How to contact the interested parties e.g.: my fax/email is, etc . . . |

It will be appreciated that the above examples of applications of the embodiments of the present invention are given by way of illustration.

The invention claimed is:

1. A method in a sub-network grouping server, the method comprising:
receiving at the sub-network grouping server regional broadcast datagrams from a sender terminal for forwarding to a plurality of destination terminals served by a plurality of sub-networks;
selecting, by the sub-network grouping server, a plurality of sub-networks according to criteria defined by said sender terminal and chosen as a function of information derived from said sender terminal without the individual destination identifications of said destination terminals being specified by said sender terminal;
providing, via the sub-network grouping server, communication of regional broadcast datagrams from said sender terminal to a plurality of servers corresponding to said selected sub-networks for forwarding of said regional broadcast datagrams, from said plurality of servers, to a plurality of destination terminals within the corresponding selected sub-networks.

2. A method as claimed in claim 1, wherein said each of said plurality of servers is directly connected to a corresponding one of said selected sub-networks.

3. A method as claimed in claim 1, receiving said regional broadcast datagrams from said sender terminal wirelessly.

4. A method as claimed in claim 1, determining, at the sub-network grouping server, correspondence between said criteria and destination identifications of said sub-networks based upon correspondence data stored at said sub-network grouping server.

5. A method as claimed in claim 1, deriving said information from said sender terminal for selection of said sub-networks from broadcast datagrams sent by said sender terminal.

6. A method as claimed in claim 1, geographically restricting said sub-networks selected by the sub-network grouping server based on criteria that includes the geographical positioning of said sub-networks relative to respective geographical regions.

7. A method as claimed in claim 6, selecting, by the sub-network grouping server, said selected sub-networks in a geographical vicinity of a sub-network server serving a communication access point of said sender terminal.

8. A method as claimed in claim 1, addressing said datagrams to all of said destination terminals served by said selected sub-networks.

9. A method as claimed in claim 1, routing said datagrams using an Internet protocol.

10. A method as claimed in claim 1, providing regional broadcast datagrams to the plurality of destination terminals via multicast or broadcast transmission.

11. Apparatus for communication of datagrams over a network that comprises sub-networks from a sender terminal to a plurality of destination terminals served by a plurality of said sub-networks, the apparatus comprises:
sub-network servers for sending messages to respective ones of said sub-networks, and
a sub-network grouping server for selecting one or more of said sub-networks and for providing communication of regional broadcast datagrams from said sender terminal to corresponding sub-network servers for said selected sub-networks, the selected sub-network being arranged to send the regional broadcast datagrams to a plurality of destination terminals within the corresponding selected sub-networks, said regional broadcast datagrams being received from said sender terminal at said sub-network grouping server by unicast transmission, and said sub-network grouping server making the selection of said sub-networks according to criteria defined by the sender terminal and chosen as a function of information derived from said sender terminal without the individual destination identifications of said destination terminals being specified by said sender terminal.

12. Apparatus as claimed in claim 11, wherein said information derived from said sender terminal for selection of said sub-networks relates to criteria for selection of said sub-networks and said sub-network grouping server stores correspondence data indicative of the correspondence between said criteria and the destination identifications of said sub-networks.

13. Apparatus as claimed in claim 11, wherein said sub-networks are geographically restricted and said criteria include the geographical positioning of said sub-networks relative to respective geographical regions.

14. Apparatus as claimed in claim 13, wherein said information derived from said sender terminal for selection of said sub-networks includes the identity of a sub-network server serving the communication access point of said sender terminal to said network and said sub-network grouping server is arranged to select sub-networks in the geographical vicinity of said sub-network server serving the communication access point of said sender terminal.

15. Apparatus as claimed in claim 11, wherein said datagrams are addressed to all of said destination terminals served by said selected sub-networks.

16. Apparatus as claimed in claim 11, wherein said datagrams are routed using an Internet protocol.

17. Apparatus as claimed in claim 11, wherein each of the selected sub-networks are arranged to send the regional broadcast datagrams to the plurality of destination terminals via multicast or broadcast transmission.

18. An apparatus for communicating a regional broadcast datagram in a communications network, the apparatus comprising:
    a transceiver;
    a controller communicably coupled to the transceiver,
    the controller configured to cause the transceiver to receive a regional broadcast datagram from a sender terminal;
    the controller is configured to select a sub-network server, of a corresponding sub-network serving a destination terminal, according to criteria defined by the sender terminal without individual destination identification information of the destination terminal being specified by the sender terminal;
    the controller is configured to cause the transceiver to communicate the regional broadcast datagram to the selected sub-network server for forwarding to the destination terminal via the sub-network.

19. The apparatus of claim 18,
    the controller configured to cause the transceiver to receive a plurality of regional broadcast datagram from the sender terminal;
    the controller is configured to select a plurality of sub-network servers, of corresponding sub-networks serving a plurality of destination terminals, according to criteria defined by the sender terminal without individual destination identification information of the destination terminals being specified by the sender terminal;
    the controller is configured to cause the transceiver to communicate the regional broadcast datagram to the selected sub-network servers for forwarding to the destination terminals via the sub-networks.

* * * * *